(12) United States Patent
Koch et al.

(10) Patent No.: US 7,780,809 B2
(45) Date of Patent: Aug. 24, 2010

(54) METHOD FOR FORMING ELASTOMERIC TIRE COMPONENT AND A TIRE

(75) Inventors: Brian Richard Koch, Hartville, OH (US); Gary Robert Burg, Massillon, OH (US); Scott Edward Ackerman, Brunswick, OH (US); Christopher David Dyrlund, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 484 days.

(21) Appl. No.: 11/496,610

(22) Filed: Jul. 31, 2006

(65) Prior Publication Data

US 2007/0029029 A1 Feb. 8, 2007

Related U.S. Application Data

(60) Provisional application No. 60/705,425, filed on Aug. 4, 2005.

(51) Int. Cl.
*B29C 47/12* (2006.01)
(52) U.S. Cl. .................. 156/244.13; 156/117; 156/130; 156/244.27; 264/209.8
(58) Field of Classification Search ................. 156/117, 156/130, 136, 397, 244.13, 244.27; 264/177.17, 264/210.2, 209.8; 425/380, 381
See application file for complete search history.

(56) References Cited

U.S. PATENT DOCUMENTS 1,572,216 A 2/1929 Mellinger
2,742,669 A 4/1956 Rhodes
3,251,722 A * 5/1966 Holman ....................... 156/130
3,268,380 A * 8/1966 Guichon et al. ............. 156/130
4,279,683 A 7/1981 Landsness .................. 156/397

(Continued)

FOREIGN PATENT DOCUMENTS

DE 697 675 10/1940

(Continued)

OTHER PUBLICATIONS

European Search Report, completed Sep. 10, 2007.

(Continued)

*Primary Examiner*—Geoffrey L Knable
(74) *Attorney, Agent, or Firm*—June E. Rickey

(57) ABSTRACT

A method of forming an elastomeric tire component is provided, comprising the following steps. An apparatus is provided which includes a rotating applicator head and a non-rotating portion. The non-rotating portion has an internal channel having a first end in fluid communication with a gear pump and a second end in fluid communication with a first channel of the rotating applicator head. The first channel is substantially aligned with the Z axis. The rotating applicator head further includes a second channel in fluid communication with the first channel, and wherein the second channel is oriented at an angle with respect to a Y axis and is in fluid communication with a nozzle. The method further includes pumping a strip of elastomeric material through said internal channel and then into said first and second channel, and then through an outlet of said nozzle onto a surface. The apparatus further comprising a tongue assembly rotatably mounted to the applicator head and being positioned adjacent said nozzle, wherein said tongue compresses said strip of elastomeric material against said surface.

4 Claims, 10 Drawing Sheets

U.S. PATENT DOCUMENTS

| | | | | |
|---|---|---|---|---|
| 4,398,492 A * | 8/1983 | Casey | | 156/397 |
| 4,420,451 A | 12/1983 | Rasmussen | | 264/173 |
| 4,877,468 A | 10/1989 | Siegenthaler | | 156/111 |
| 4,923,706 A | 5/1990 | Binley et al. | | 426/516 |
| 4,933,034 A | 6/1990 | Kokubu et al. | | 156/136 |
| 4,944,666 A | 7/1990 | Hilke et al. | | 425/131.1 |
| 4,963,207 A | 10/1990 | Laurent | | 156/117 |
| 4,983,239 A | 1/1991 | Holroyd et al. | | 156/123 |
| 5,069,853 A | 12/1991 | Miller | | 264/176.1 |
| 5,100,497 A | 3/1992 | Moody et al. | | 156/460 |
| 5,162,070 A * | 11/1992 | Meyer | | 156/500 |
| 5,167,892 A | 12/1992 | Yokoi et al. | | 264/152 |
| 5,178,714 A | 1/1993 | Glover et al. | | 156/117 |
| 5,203,938 A | 4/1993 | Moody et al. | | 156/136 |
| 5,221,406 A | 6/1993 | Laurent | | 156/397 |
| 5,221,541 A | 6/1993 | Arbour et al. | | 425/188 |
| 5,297,949 A | 3/1994 | Yokoi et al. | | 425/297 |
| 5,328,533 A | 7/1994 | Yasumo et al. | | 156/136 |
| 5,336,349 A | 8/1994 | Cornils et al. | | 156/107 |
| 5,342,473 A | 8/1994 | Bibona et al. | | 156/394.1 |
| 5,391,342 A | 2/1995 | Moody et al. | | 265/210.2 |
| 5,447,587 A | 9/1995 | Bibona et al. | | 156/64 |
| 5,454,894 A | 10/1995 | Makinson et al. | | 156/116 |
| 5,458,727 A * | 10/1995 | Meyer | | 156/405.1 |
| 5,587,041 A | 12/1996 | Sandusky et al. | | 156/441 |
| 5,653,840 A | 8/1997 | Makinson et al. | | 156/116 |
| 5,735,995 A | 4/1998 | Bull et al. | | 156/398 |
| 5,885,386 A | 3/1999 | Makinson et al. | | 152/523 |
| 5,989,374 A | 11/1999 | Bull et al. | | 156/136 |
| 6,089,844 A | 7/2000 | Meyer | | 425/17 |
| 6,109,322 A | 8/2000 | Benzing, II et al. | | 152/548 |
| 6,372,070 B1 | 4/2002 | Iizuka et al. | | 156/117 |
| 6,468,067 B1 * | 10/2002 | Ikegami | | 425/209 |
| 6,623,598 B2 | 9/2003 | Fischer | | 156/405.1 |
| 6,632,307 B2 | 10/2003 | Fischer | | 156/96 |
| 6,799,881 B2 | 10/2004 | Fischer | | 366/80 |
| 2002/0005243 A1 | 1/2002 | Fischer | | 156/96 |
| 2002/0005256 A1 | 1/2002 | Fischer | | 156/397 |
| 2002/0017357 A1 | 2/2002 | Fischer | | 156/111 |
| 2002/0053389 A1 | 5/2002 | Martin et al. | | 156/126 |
| 2002/0126567 A1 | 9/2002 | Fischer | | 366/83 |
| 2003/0157210 A1 | 8/2003 | Fischer | | 425/135 |
| 2004/0055711 A1 * | 3/2004 | Martin et al. | | 156/397 |
| 2004/0089400 A1 * | 5/2004 | Vargo et al. | | 156/136 |
| 2007/0031529 A1 | 2/2007 | Koch et al. | | |

FOREIGN PATENT DOCUMENTS

| | | |
|---|---|---|
| DE | 28 03 460 | 8/1979 |
| DE | 102 28 372 A1 | 2/2003 |
| EP | 0 637 506 A1 | 2/1995 |
| EP | 0 970 797 A2 | 1/2000 |
| EP | 1 120 232 A2 | 8/2001 |
| EP | 1 199 148 | 4/2002 |
| EP | 1 418 043 | 5/2004 |
| EP | 1 454 732 A1 | 9/2004 |
| GB | 853802 | 2/1959 |
| GB | 1 590 378 | 6/1981 |
| JP | 6-320590 | 11/1994 |
| JP | 09-254274 A | 9/1997 |
| JP | 11 105155 A | 4/1999 |
| JP | 2002 187218 A | 7/2002 |
| WO | WO 03/066313 A1 | 8/2003 |
| WO | WO 2004-028779 A1 | 4/2004 |

OTHER PUBLICATIONS

Patent Abstracts of Japan, Publication No. 06320590, published Nov. 22, 1994.

* cited by examiner ical Field

This invention relates to a method for forming elastomeric tire components and a tire.

BACKGROUND OF THE INVENTION

It is well known in the prior art to manufacture tire components from elastomeric sheets of rubber which are then cut to length and lapped or butt spliced onto a cylindrically shaped building drum. The tire building drum is then expanded radially in the center and the ends are drawn in axially to shape the tire into a torus. Belts of cord-reinforced layers and a strip of tread rubber are applied over the crown of the green carcass to form a "green" or unvulcanized tire assembly. The finished tire assembly is then placed into a tire mold and cured in a process called vulcanization to make a tire.

Since the tire components are assembled flat onto a cylindrical tire building drum and then expanded into a toroidal shape, each component has to be placed in tension or compression prior to being molded. This stretching of the various parts causes slippage between the various rubber parts as the components heat up during vulcanization. Attempts to minimize the slippage of the various parts have been attempted. Another disadvantage is that the tire has components which are spliced, and which contribute to tire nonuniformity.

Tire manufacturers have been increasingly focusing their efforts on eliminating tire nonuniformities. More recently, tire manufacturers are making tire components from a continuous strip of unvulcanized rubber. A thin, narrow strip of unvulcanized rubber is circumferentially wound multiple times onto a rotating drum or toroid shaped core, wherein the strips are successively layered or stacked in order to form the desired shape of the tire component. See for example, U.S. Pat. Nos. 6,372,070 and 4,963,207. The strip of rubber is typically extruded directly onto a tire building drum or toroidal-shaped core using an extruding device. Alternatively the strips may be formed from calendering and then conveyed to the tire drum or core.

This strip lamination method of forming tire components has the advantage of eliminating splices because the annular tire component is typically formed of one continuous strip. Strip lamination has the further advantage of allowing flexibility in manufacturing, since the tire component profile may be changed from tire to tire. However, there are several disadvantages to strip lamination. First, trapped air or air pockets may be formed in between the strips, creating gaps in the finished tire component. A second disadvantage to the strip lamination is that the contour of the tire component is an approximation due to the stacking of the strips which have a fixed geometrical shape. Further as a result of the stacking, the outer surfaces of the tire component are not smooth. The component contour typically has staggered top and bottom surfaces which can cause surface defects commonly referred to as "lights" or discolorations. A third disadvantage is that the strips need to be stitched to the drum or core using a pressure roller or stitcher, and the rubber tends to stick to the roller. A further disadvantage is that since the component is formed from multiple strips, it is only an approximation of the desired shape.

DEFINITIONS

"Aspect ratio" of the tire means the ratio of its section height (SH) to its section width (SW);

"Axial" and "axially" means lines or directions that are parallel to the axis of rotation of the tire;

"Bead" means that part of the tire comprising an annular tensile member with or without other reinforcement elements such as flippers, chippers, apexes, toe guards and chafers, to fit the design rim;

"Belt reinforcing structure" means at least two layers of plies of parallel cords, woven or unwoven, underlying the tread, unanchored to the bead, and having both left and right cord angles in the range from 17 degrees to 27 degrees with respect to the equatorial plane of the tire;

"Carcass" means the tire structure apart from the belt structure, tread, under tread, and sidewall rubber over the plies, but including the beads;

"Circumferential" means lines or directions extending along the perimeter of the surface of the annular tread perpendicular to the axial direction;

"Chafers" refers to narrow strips of material placed around the outside of the bead to protect cord plies from the rim, distribute flexing above the rim, and to seal the tire;

"Chippers" means a reinforcement structure located in the bead portion of the tire;

"Cord" means one of the reinforcement strands of which the plies in the tire are comprised;

"Design rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tire and Rim Technical Organization—Standards Manual and the term design rim means the same as the standard measurement rims. In Japan, the standard organization is The Japan Automobile Tire Manufacturer's Association.

"Equatorial plane" (EP) means the plane perpendicular to the tire's axis of rotation and passing through the center of its tread;

"Footprint" means the contact patch or area of contact of the tire tread with a flat surface at zero speed and under normal load and pressure;

"Innerliner" means the layer or layers of elastomer or other material that form the inside surface of a tubeless tire and that contain the inflating fluid within the tire;

"Net-to-gross ratio" means the ratio of the tire tread rubber that makes contact with the road surface while in the footprint, divided by the area of the tread in the footprint, including non-contacting portions such as grooves;

"Normal rim diameter" means the average diameter of the rim flange at the location where the bead portion of the tire seats;

"Normal inflation pressure" refers to the specific design inflation pressure and load assigned by the appropriate standards organization for the service condition for the tire;

"Normal load" refers to the specific design inflation pressure and load assigned by the appropriate standards organization for the service condition for the tire;

"Ply" means a continuous layer of rubber-coated parallel cords;

"Radial" and "radially" means directions radially toward or away from the axis of rotation of the tire;

"Radial-ply tire" means belted or circumferentially-restricted pneumatic tire in which the ply cords which extend from the bead to bead are laid at cord angles between 65 degrees and 90 degrees with respect to the equatorial plane of the tire;

"Section height" (SH) means the radial distance from the nominal rim diameter to the outer diameter of the tire at its equatorial plane; and, "Section width" (SW) means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

BRIEF DESCRIPTION OF THE DRAWINGS

The invention will be described by way of example and with reference to the accompanying drawings in which.

DETAILED DESCRIPTION OF THE INVENTION

A first embodiment of a rubber applicator apparatus 100 is shown in FIGS. 1-13. The applicator apparatus 100 provides a novel method and apparatus to form elastomeric tire components quickly and efficiently. The apparatus 100 permits the tire components to be quickly and efficiently formed from a single continuous wound strip or multiple strips of unvulcanized rubber. A continuous strip or strips of unvulcanized rubber may be applied directly onto a tire building surface such as a tire building drum A or a toroidal shaped core (not shown).

Figure 1:
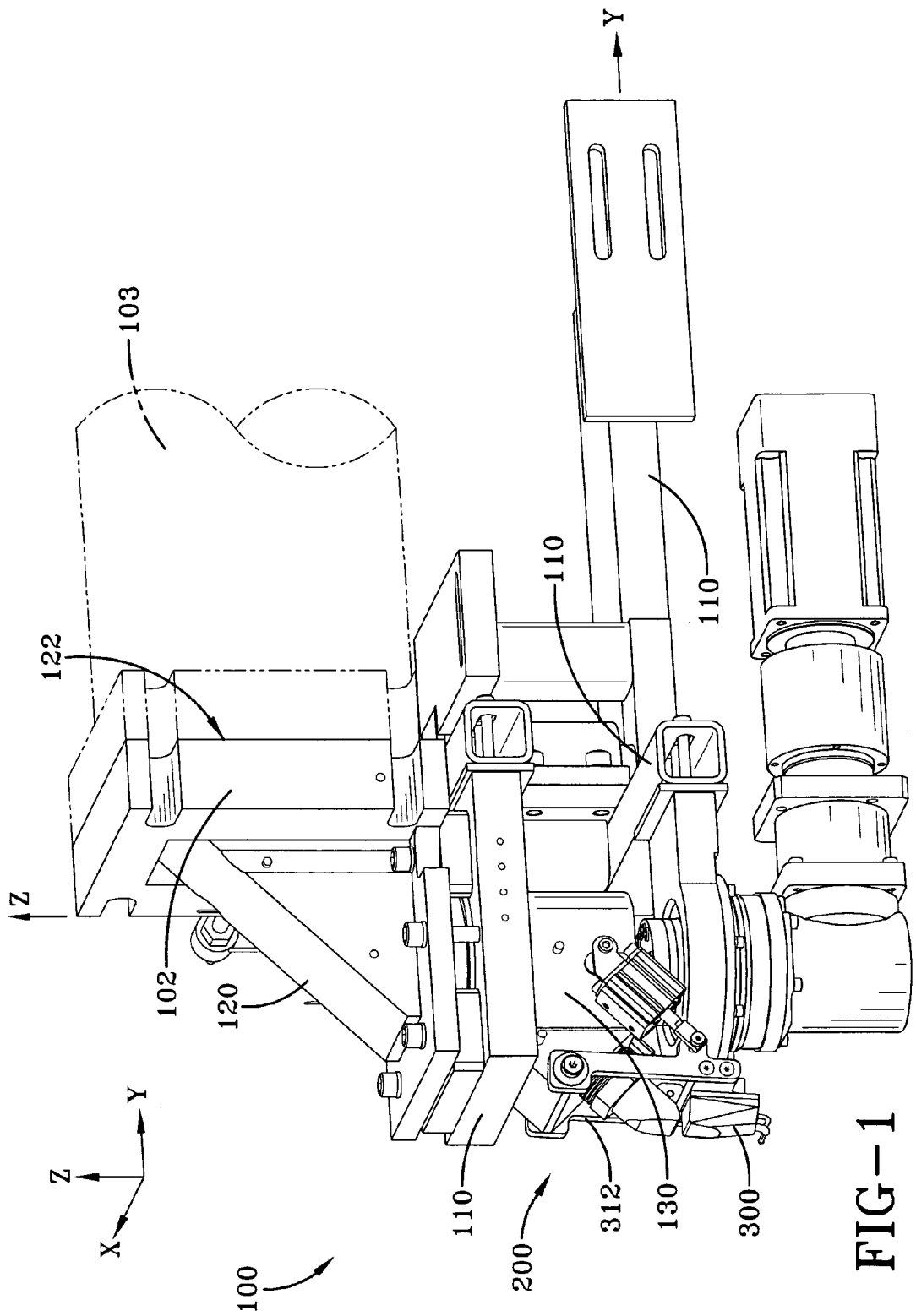
FIG. 1 is a side perspective view of a rubber applicator apparatus of the present invention.
Figure 2:
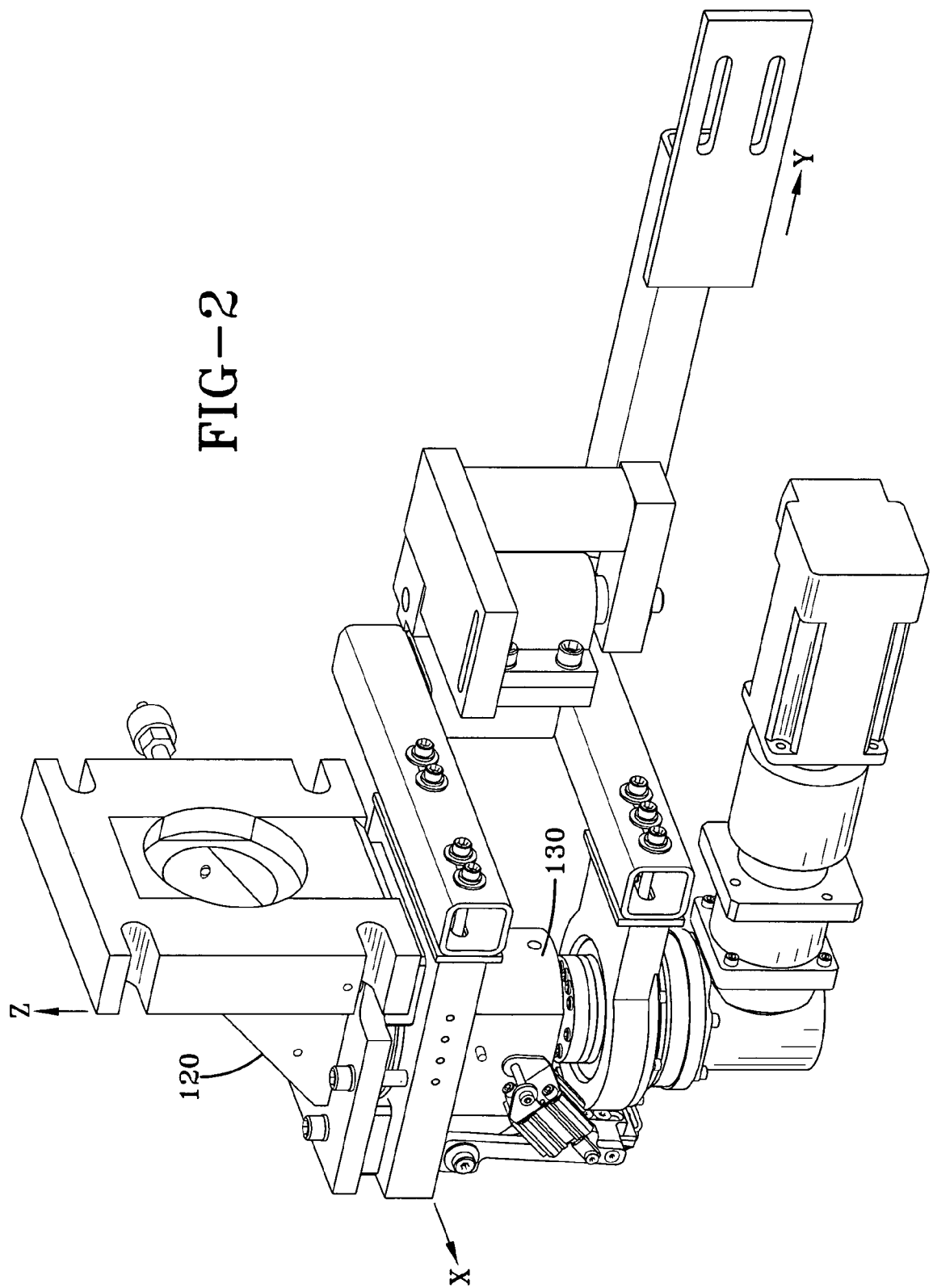
FIG. 2 is a rear perspective view of the rubber applicator apparatus of FIG. 1.
Figure 3:
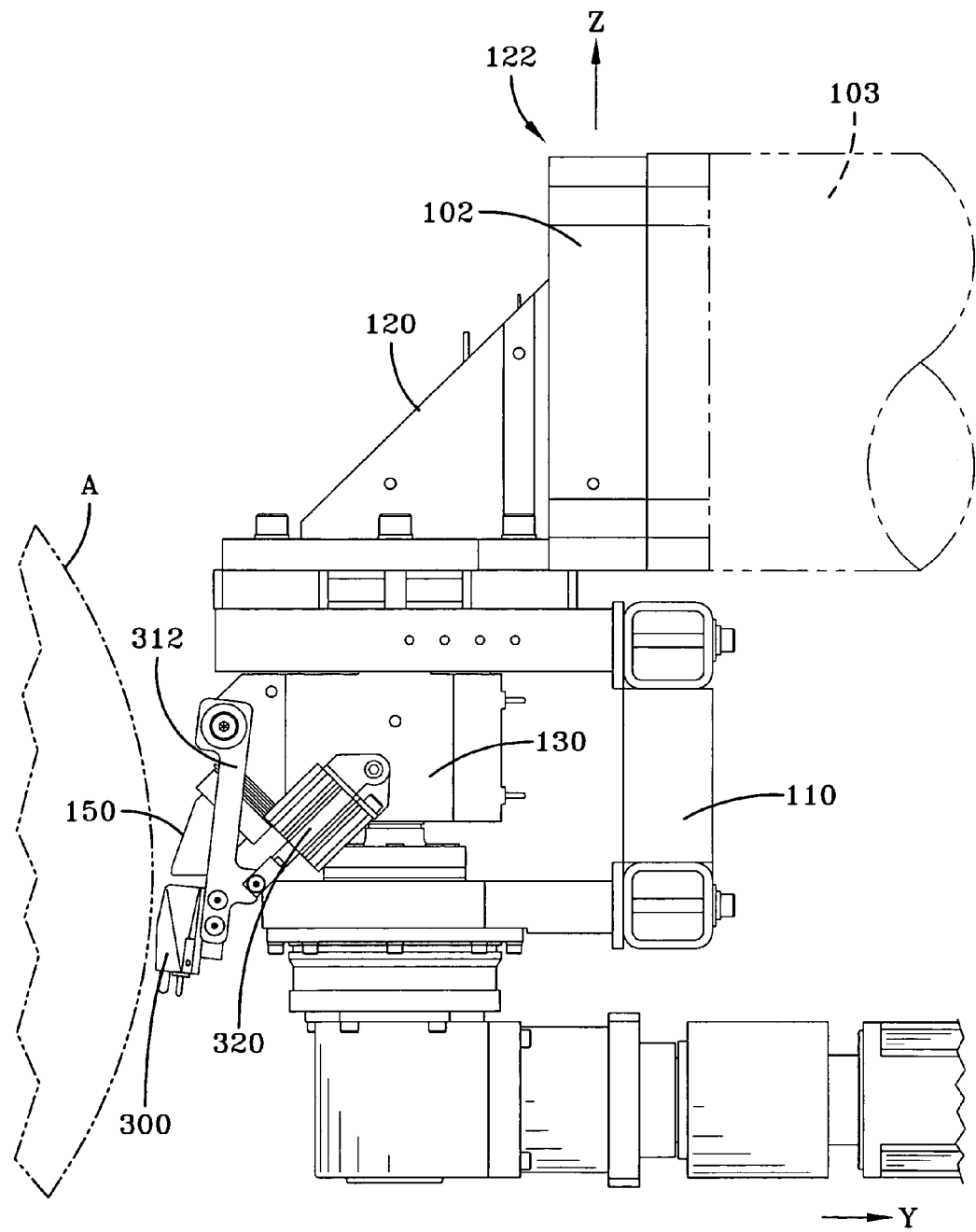
FIG. 3 is a side view of a portion of the apparatus of FIG. 1, shown together with a tire building drum, in phantom.
Figure 4:
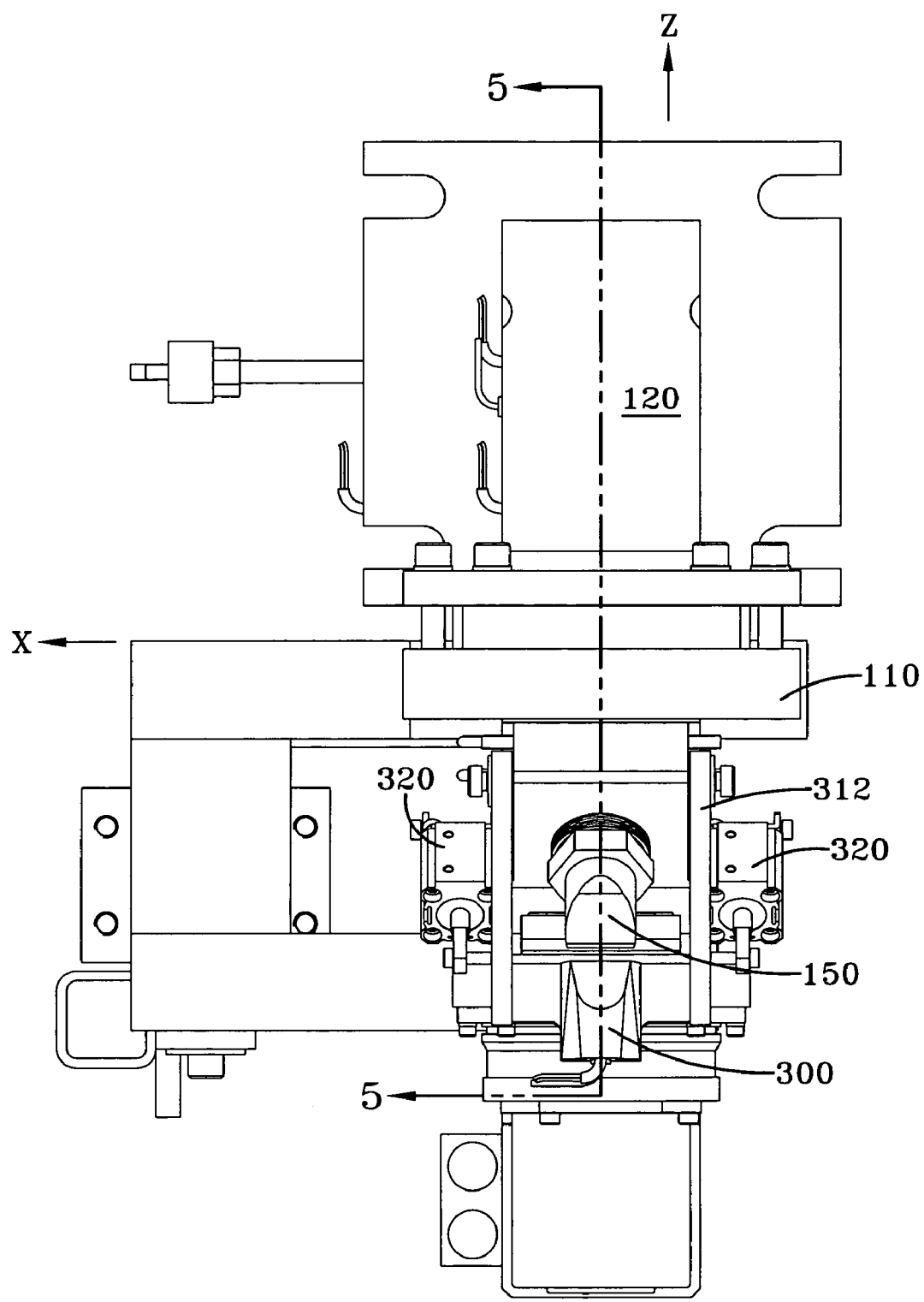
FIG. 4 is a front view of the rubber applicator apparatus of FIG. 1.

As shown in FIG. 1, the applicator apparatus 100 includes a support frame 110 (parts of which have been removed for clarity), and a rubber applicator subassembly 200. The support frame may further include support rails for translating the entire applicator apparatus in the X, Y and Z direction (not shown).

Figure 5:
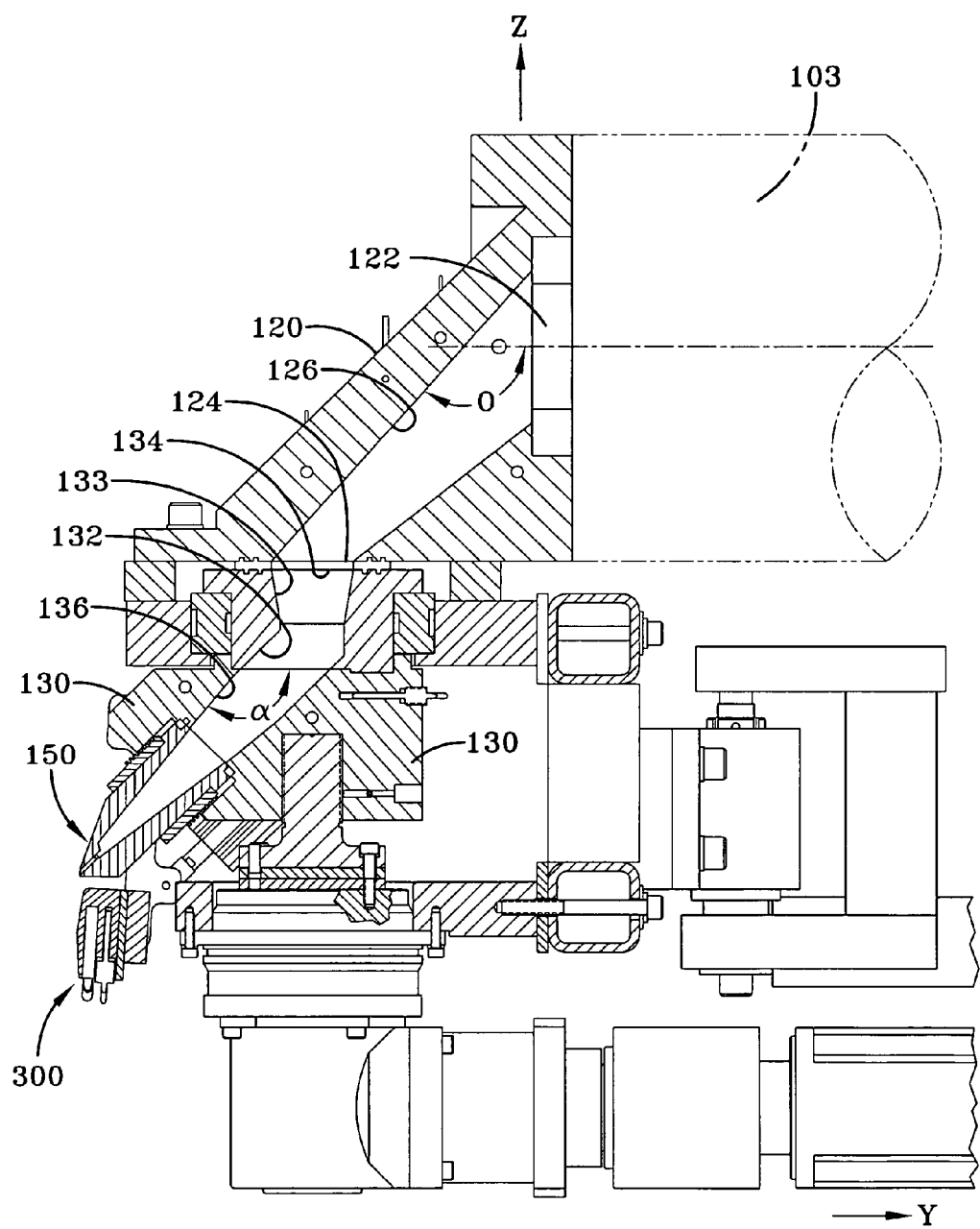
FIG. 5 is a cross sectional view of the rubber applicator apparatus taken in the direction 5-5 of FIG. 4.

The applicator apparatus 100 has a mounting flange 102 for connecting to a rubber pumping means 103 such as an extruder, gear pump, gear pump-extruder, or rubber injector (not shown). An extruder suitable for use with the invention is made by VMI AZ Formen und Maschienenbau of Munich, Germany. The rubber or elastomer output from the rubber pumping means is fed into a transition member 120. As best shown in FIG. 5, transition member 120 has an interior channel 126 having an inlet end 122 and an outlet end 124. The inlet end 122 preferably has a larger area than the outlet end 124, resulting in a decreasing area or a funnel-shaped channel 126. Channel 126 is also angled downwardly (angle θ), wherein θ is in the range of about 120 to about 165 degrees with respect to the Y axis, more typically about 135-150 degrees. The outlet end 124 of the transition member is connected to a rotatably mounted applicator head 130 which rotates about the Z axis. The applicator head can rotate in the range of about, 360 degrees, or more typically about +/−150 degrees from the center position.

The rotatable applicator head 130 further comprises an internal channel 132 which is fluid communication with the funnel shaped channel 126. The channel 132 has a first portion 133 which is substantially aligned with the axis of rotation of the applicator head 130, i.e., the Z axis. The rubber or elastomer flow from the extruder to the inlet end 122 of the transition member is primarily oriented in the Y direction. Thus, the rubber or elastomer material flowing within the interior channels 126,132 changes from flowing predominantly along the Y axis, transitioning to flow substantially in a second direction parallel to the axis of rotation, for example along the Z axis prior to entering the rotatable applicator inlet 134. Because the rubber material changes direction prior to entering the rotatable applicator head, the flow remains unaffected by the rotation of the applicator head. Since rubber or elastomers have memory, changing direction of the rubber material prior to rotation prevents the material from curling or otherwise having an undesirable non-uniform flow.

Applicator channel 132 further comprises a second portion 136 having a decreasing area towards the applicator nozzle. The applicator channel 132 is also angled, forming an angle α a in the range of about 120-150 degrees with respect to the Y axis, more typically about 135 degrees. The use of two angled channels 126, 136 instead of one steeply angled channel (about 90 degrees) results in less flow resistance, resulting in a more efficient system. Still further, the use of decreasing area channels further contributes to the efficiency of the system, requiring less energy to push the rubber flow out of the system.

Figure 6:
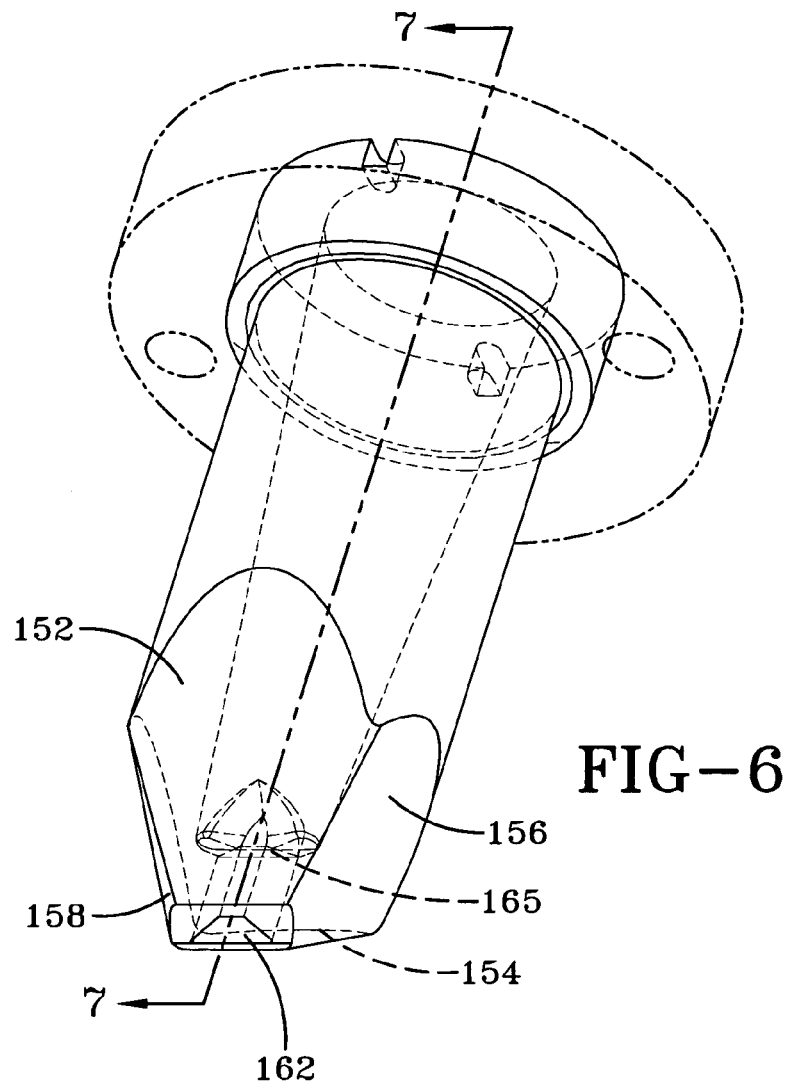
FIG. 6 is a perspective view of a nozzle.
Figure 7:
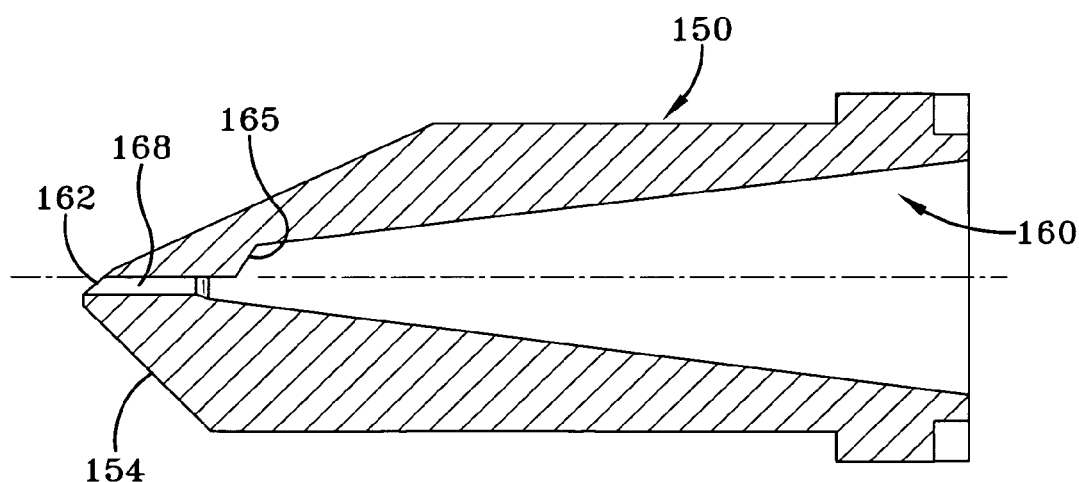
FIG. 7 is a cross sectional view of the nozzle of FIG. 6 in the direction 7-7.
Figure 8:
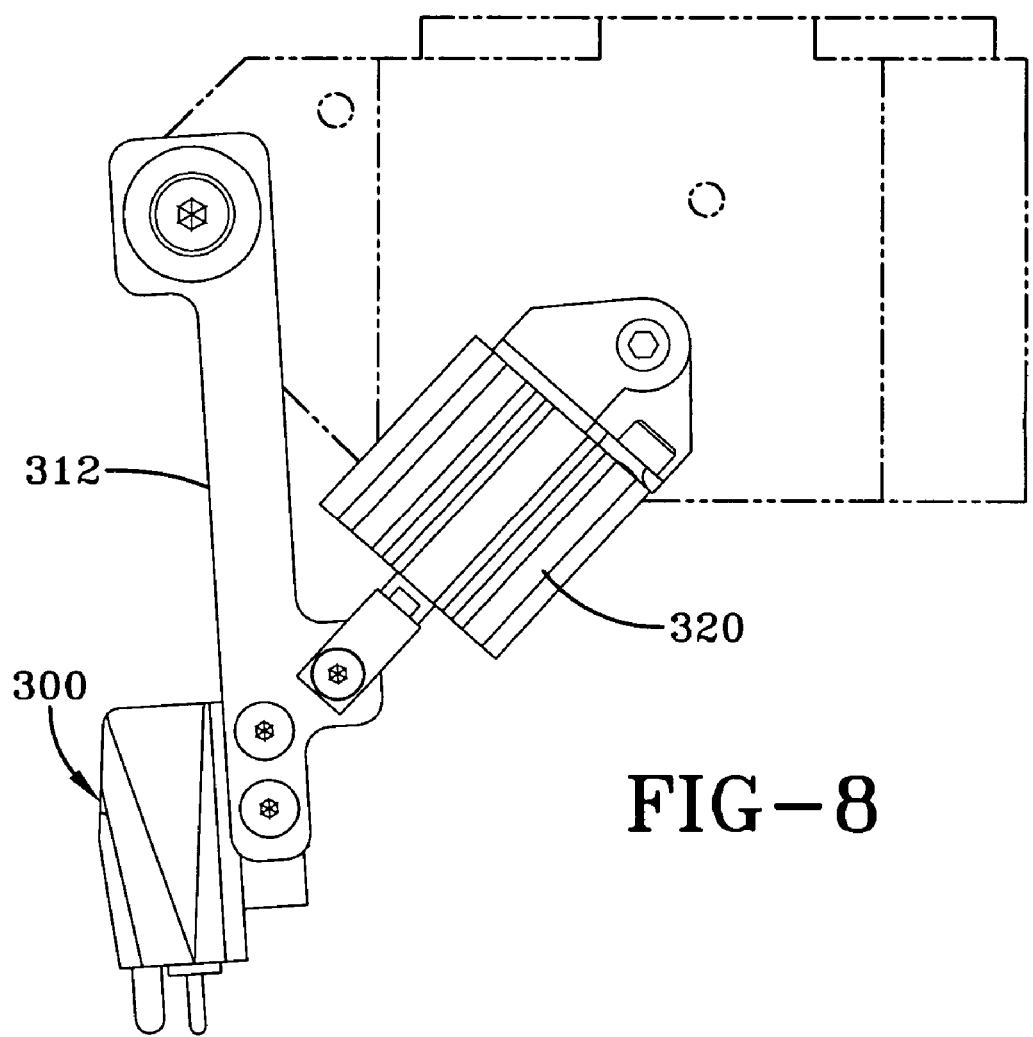
FIG. 8 is a side view of a tongue assembly.
Figure 11:
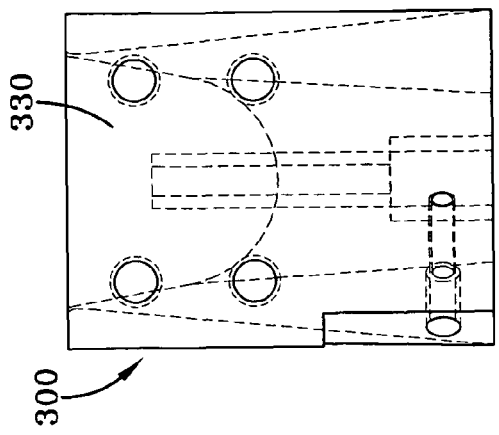
FIG. 11 is a rear view of the tongue assembly.
Figure 10:
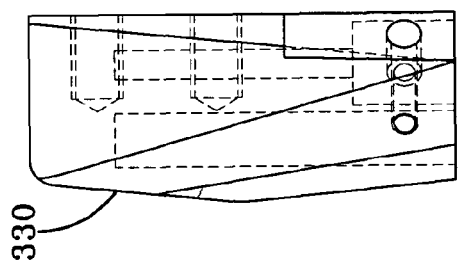
FIG. 10 is a side view of the tongue assembly.
Figure 12:
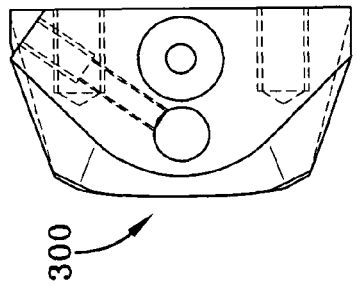
FIG. 12 is a top view of the tongue assembly.
Figure 9:
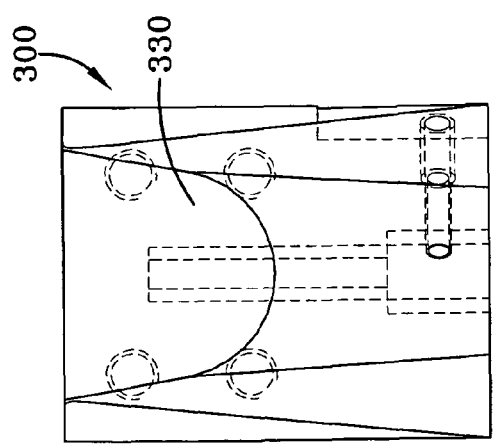
FIG. 9 is a front view of the tongue assembly.

The outlet end of the applicator channel is in fluid communication with the inlet of a nozzle 150. The nozzle 150, as best shown in FIGS. 6-7, has an outer generally cylindrical profile with one or more angled faces 152, 154, 156, 158. However, other nozzle configurations may also be used with the invention, as described in more detail, below. The interior channel 160 has a decreasing area towards the outlet orifice 162 of the nozzle. The nozzle channel 160 preferably has a length/diameter ratio in the range of 2-15, preferably about 5-7, and even more preferably about 6-7. The nozzle channel may optionally include a flow restrictor 165 in the form of an angled edge transverse to the direction of flow. The flow restrictor is preferably located in the center of the interior of the nozzle and functions to decrease the velocity of the flow of rubber located in the center of the nozzle increasing the velocity of the rubber at the outermost portions of the nozzle. This feature helps reduce the swell of the rubber. The interior channel 160 after the flow restrictor reduces to a short tube 168. The outlet orifice 162 of the nozzle is shown with a trapezoidal shape, however other configurations may be used such as, but not limited to, square, rectangular, triangular, etc. The width of the rubber strip output from the nozzle orifice is typically about 15 mm in width, but may vary in the range of about 5 mm to about 30 mm. The nozzle 150 may be optionally heated to a temperature in the range of about 0 to about 230 degrees F., preferably in the range of about 0 to about 200 degrees F, using external or internal heaters (not shown).

Figure 16:
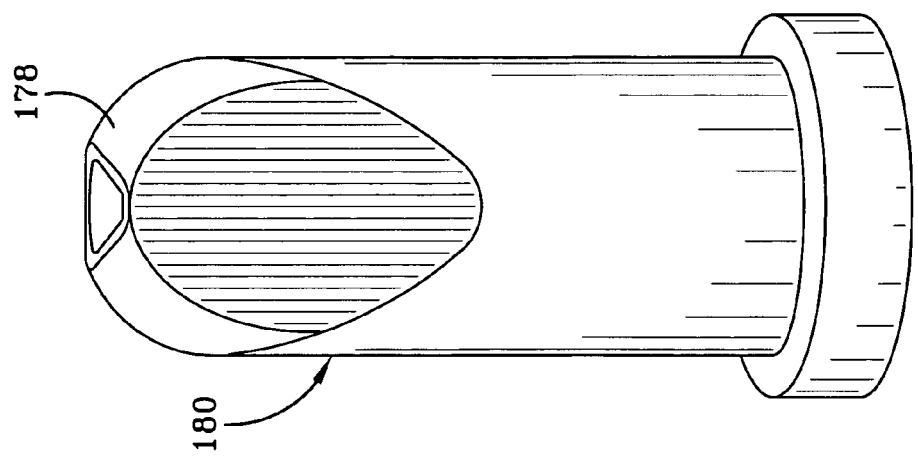
FIGS. 14-16 illustrate perspective views of alternate nozzle assemblies.
Figure 15:
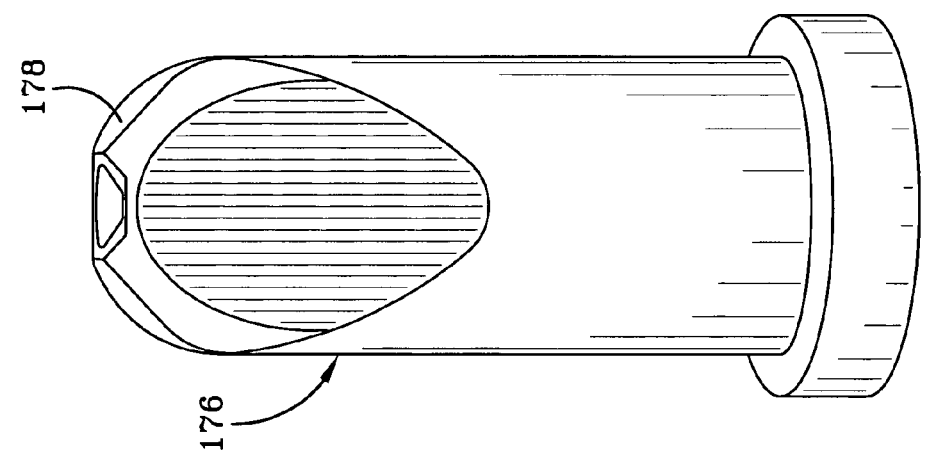
Figure 14:
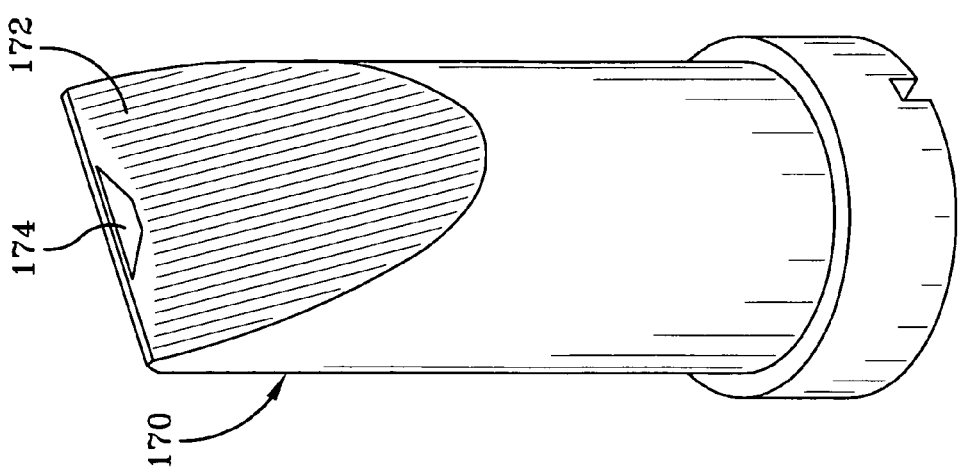

The nozzle may also have other external configurations, such as shown for example in FIGS. 14-16. FIG. 14 illustrates a generally cylindrical nozzle 170 having a beveled edge 172 and a trapezoidal shaped orifice 174. FIGS. 15 and 16 illustrate nozzles 176, 180 which are similar in shape to the nozzle of FIG. 14, except that the side ends 178 have been radiused.

Figure 13:
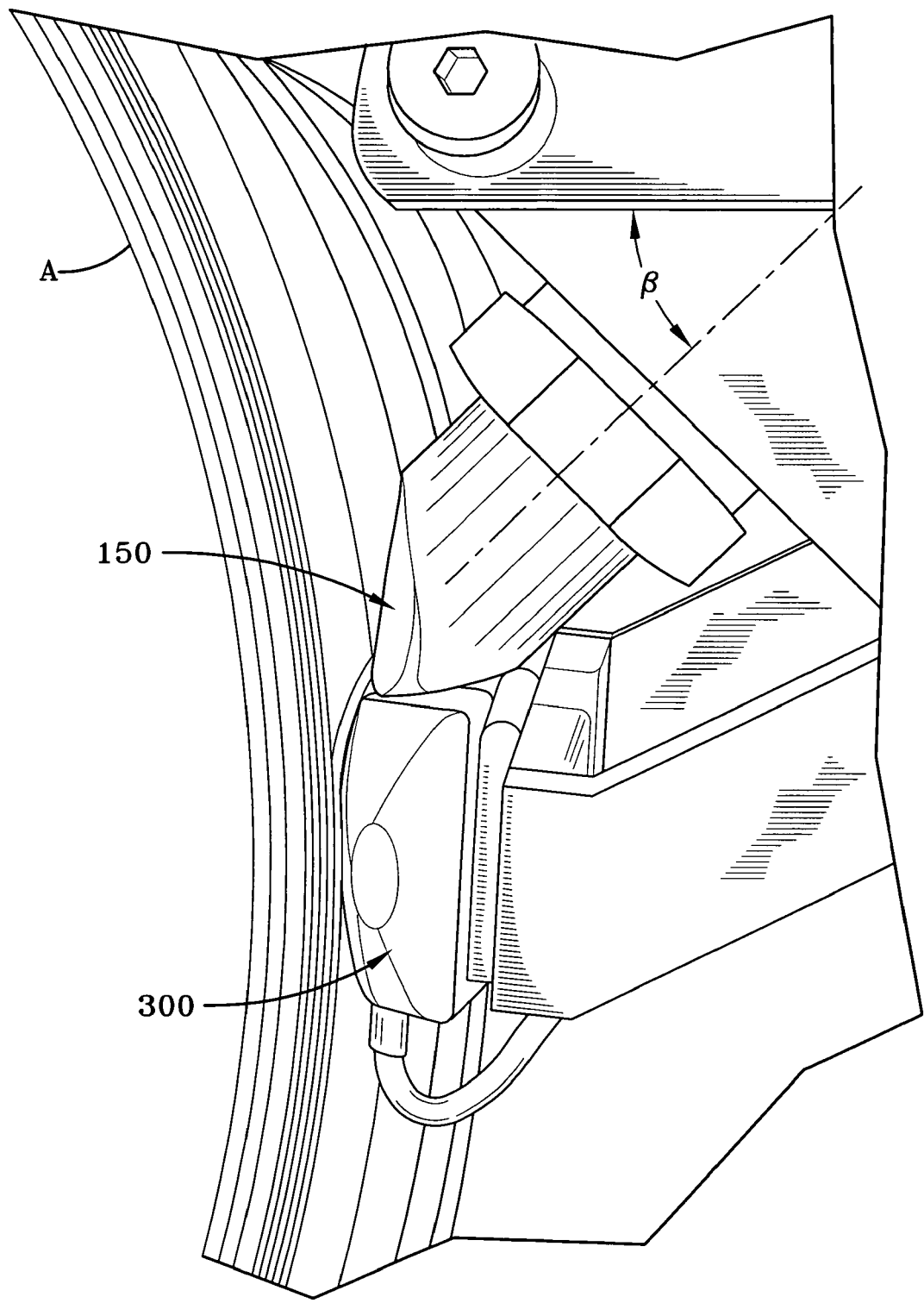
FIG. 13 is a side view of the rubber applicator apparatus and tongue assembly shown applying rubber to a tire building drum.

As shown in FIG. 13, the nozzle 150 is oriented with respect to the tire building drum A, core (not shown) or other application surface typically at an angle β in the range of about 0 to about 90 degrees, more typically in the range of about 35-90 degrees. It is preferred that the rubber output from the nozzle be oriented about 90 degrees relative to the application surface, although α may range from about 35-90 degrees.

Adjacent the nozzle is an optional tongue assembly 300. The tongue 300 is rotatably mounted to a frame 310 having forked ends 312 which are rotatably mounted to the applicator apparatus 100. Also mounted to the tongue support frame 310 are dual hydraulic or pneumatic cylinders 320 which press the tongue into engagement with the applicator surface as well as providing a shock absorbing or damping function. The tongue could also be spring mounted onto the support frame. The cylinders allow the tongue to "float" over the drum, which is important due to the drum runout or uneven surface. The tongue engagement pressure may be variable and may range from about 0 to about 100 psi. The tongue 300 as shown in FIGS. 9-12, has a generally outer convex surface 303 with rounded edges and a beveled lip 330 which engages the applicator surface. The tongue 300 may also comprise additional shapes such as flat surface, convex or radiused outer surface or a concave surface.

The tongue assembly preferably has internal heaters for heating the outer surface in the range of about 200 to about 400 degrees F., and more preferably in the range of about 350 to about 400 degrees F. Thus the tongue functions as a hot knife, smoothing and smearing the freshly deposited rubber, melting and blending the adjacent strips of rubber together, into a homogeneous mass. The higher tongue temperature does not impact the curing of rubber due to the short residence time of the tongue on the rubber. The tongue assembly also performs a stitcher function due to the pressure of the tongue against the drum, smoothing out the air pockets. The outer surface of the tongue also helps shape the formed component.

The following steps describe the formation of a tire component such as a sidewall, chafer, liner, or other elastomeric article. Rubber or elastomer is fed to a pumping means, such as an injector, gear pump, extruder or combination thereof. The extrudate then enters the applicator head 100. In the applicator head, the elastomeric material is fed through a first stationary channel, a transition channel and then a second channel. The first channel is stationary, while the transition channel and the second channel are contained within the rotatable head. Each channel has a decreasing area from the inlet end to the outlet end and is angled downwardly, taking advantage of gravity. In between the first and second channels is a short vertical transition channel. In the short transition channel the extrudate flows vertically. The advantage to this configuration is that the rotatable head can pivot without affecting the fluid dynamics of the rubber. The flow exits the second channel and enters a nozzle. The nozzle has a decreasing area and a flow restrictor. The nozzle is oriented at an angle with respect to a tire building surface or core. The nozzle assembly is capable of translating in three directions in discrete index positions in order to accurately apply the rubber to the building surface. The support surface can be is a toroid shaped core or a cylindrical shaped tire building drum, or any other desired shape. The primary advantage of applying the strip to a toroidally shaped surface is the finished part is accurately positioned in a green uncured state at the proper orientation to be molded without requiring any change in orientation from the condition in which the strip was initially formed.

The extrudate exits the nozzle in a strip form, having the desired shape of the exit orifice of the nozzle. If a drum or toroid is used as an applicator surface, as the drum or core rotates, a continuous annular strip may be formed. The nozzle can be indexed axially so to form the desired shape of the component. The nozzle can be controlled by a control system wherein the movement of the nozzle so that the multiple layers of strip dictates the shape of the desired tire component.

An optional tongue which is preferably heated is located adjacent the nozzle. The tongue is rotatable mounted near the nozzle to a frame. The tongue assembly may also be connected to a damping device such as a pneumatic or hydraulic cylinder which dampens the movement of the tongue in response to the drum variation in diameter (drum runout). The tongue assembly is preferably heated to a temperature so that the tongue heats adjacent strips of rubber, while smoothing and compressing the strips in order to form a solid monolithic mass.

The profile of each formed component can be varied in a fashion such that the cross-sectional thickness is very thin as in the tip of an apex or thick near the bead core. Also the entire profile can be thin as in a liner component. The nozzle and/or tongue assembly can articulate moving in numerous directions the numerous degrees of freedom enabling the nozzle/tongue assembly to form flat, convex or concave curvatures as the material is spread. In addition, the numerous degrees of freedom allow the components such as a sidewall to be built. What is important to note is some or all of these tire components can be formed using this technique of the present invention. The tire manufacturer simply can choose which components can be most efficiently produced using this technique.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of forming an elastomeric tire component comprising the steps of: providing an apparatus having a rotating applicator head connected to a nozzle, and a non-rotating portion having an internal channel having a first end in fluid communication with a gear pump, and a second end in fluid communication with a first channel of the rotating applicator head, wherein flow of elastomeric material entering the first end is parallel to a Y axis;
   said rotating applicator head being rotatable about a Z axis, said first channel being substantially aligned with the Z axis and said rotating applicator head having a second channel oriented at an angle alpha with respect to the Y axis and in fluid communication with the nozzle, wherein alpha is in the range of about 120 to about 150 degrees with respect to the Y axis;
   pumping a strip of elastomeric material through said internal channel and then into said first and second channel, and then through an outlet of said nozzle onto a surface, said apparatus further comprising a tongue assembly rotatably mounted to the applicator head and being positioned adjacent said nozzle, wherein said tongue compresses said strip of elastomeric material against said surface.

2. The method of forming an elastomeric tire component of claim 1 wherein the elastomeric material is compressed and heated simultaneously by said outer surface of the tongue assembly, wherein the outer surface is heated to a temperature in the range of about 200 to about 400 degrees F.

3. The method of forming an elastomeric tire component of claim 1 wherein the surface is a rotating drum.

4. The method of forming an elastomeric tire component of claim 1 wherein the tongue assembly is connected to a damping device.

* * * * *